United States Patent
Sun et al.

(10) Patent No.: US 8,948,249 B2
(45) Date of Patent: Feb. 3, 2015

(54) ENCODER-AIDED SEGMENTATION FOR ADAPTIVE STREAMING

(75) Inventors: Wendell Sun, San Diego, CA (US); Jing Yang Chen, San Diego, CA (US); John R. Shumate, Encinitas, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 224 days.

(21) Appl. No.: 13/588,885

(22) Filed: Aug. 17, 2012

(65) Prior Publication Data

US 2013/0064283 A1 Mar. 14, 2013

Related U.S. Application Data

(60) Provisional application No. 61/525,184, filed on Aug. 19, 2011.

(51) Int. Cl.
| | |
|---|---|
| *H04N 7/26* | (2006.01) |
| *H04N 21/2343* | (2011.01) |
| *H04N 21/845* | (2011.01) |
| *H04N 21/24* | (2011.01) |
| *H04N 21/61* | (2011.01) |

(52) U.S. Cl.
CPC ....... *H04N 21/2343* (2013.01); *H04N 21/8455* (2013.01); *H04N 21/23439* (2013.01); *H04N 21/8456* (2013.01); *H04N 21/2402* (2013.01); *H04N 21/6125* (2013.01)
USPC .................................................. 375/240.01

(58) Field of Classification Search
CPC .......... H04N 21/2343; H04N 21/8456; H04N 21/23439; H04N 21/2402; H04N 21/6125; H04N 21/8455; H04N 21/242
USPC ........................................ 375/240.01, 240.02
See application file for complete search history.

(56) References Cited

U.S. PATENT DOCUMENTS

| | | | |
|---|---|---|---|
| 8,458,362 B2 * | 6/2013 | Holden et al. ................ 709/246 |
| 8,532,171 B1 * | 9/2013 | Narayanan et al. ...... 375/240.01 |
| 2010/0189183 A1 | 7/2010 | Gu et al. |
| 2011/0082924 A1 | 4/2011 | Gopalakrishnan |
| 2011/0119395 A1 * | 5/2011 | Ha et al. ....................... 709/231 |
| 2011/0268178 A1 * | 11/2011 | Park et al. ............... 375/240.02 |
| 2011/0317771 A1 * | 12/2011 | Chen et al. .............. 375/240.25 |
| 2012/0042091 A1 * | 2/2012 | McCarthy et al. ........... 709/231 |
| 2012/0278449 A1 * | 11/2012 | Wu et al. ...................... 709/219 |
| 2013/0044803 A1 * | 2/2013 | Fisher et al. ............ 375/240.02 |
| 2013/0293677 A1 * | 11/2013 | Lee et al. ....................... 348/43 |

OTHER PUBLICATIONS

MacAulay et al., IP Streaming of MPEG-4: Native RTP vs MPEG-2 Transport Stream, Envivio WhitePaper, Oct. 2005.*

(Continued)

*Primary Examiner* — Jay Au Patel
*Assistant Examiner* — Francis G Geroleo
(74) *Attorney, Agent, or Firm* — Amin, Turocy & Watson, LLP

(57) ABSTRACT

In one embodiment, a method for encoding content includes receiving source content and encoding the source content into a plurality of content streams. The encoding includes aligning the plurality of content streams at Group of Pictures (GOP) boundaries. The encoding further includes embedding, in each content stream, metadata identifying segmentation points within the content stream, where the segmentation points correspond to one or more of the GOP boundaries.

17 Claims, 7 Drawing Sheets

(56) References Cited

OTHER PUBLICATIONS

Multi-Screen IP Video Delivery—Understanding IP Video Transcoding, Packaging and Delivery Requirements for Carrier-Class Providers, White Paper, R1103-0611-02, RGB Networks, Inc., 2010-2011.
Open Iptv Forum: "O I P F Release 2 Specification, vol. 2a—HTTP Adaptive Streaming [V2.1]; Jun. 21, 2011", (Jun. 21, 2011).
PCT Search Report & Written Opinion, RE: Application #PCT/US2012/051468; Nov. 22, 2012.
"Using a Manifest XML File to Convey SCTE 35 Messaging Information Through the Use of an Alternative Video/ Audio View Mechanism," IP.Com Journal; Sep. 28, 2010.

* cited by examiner

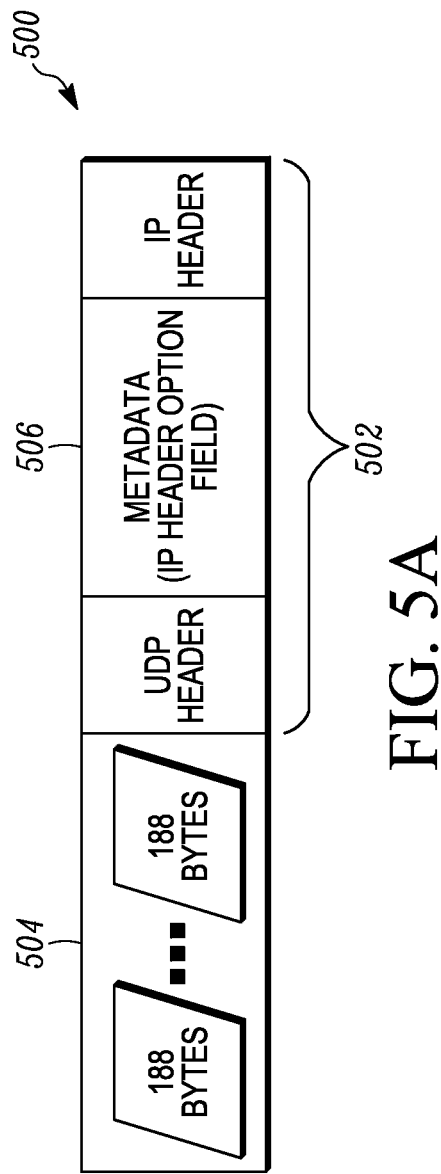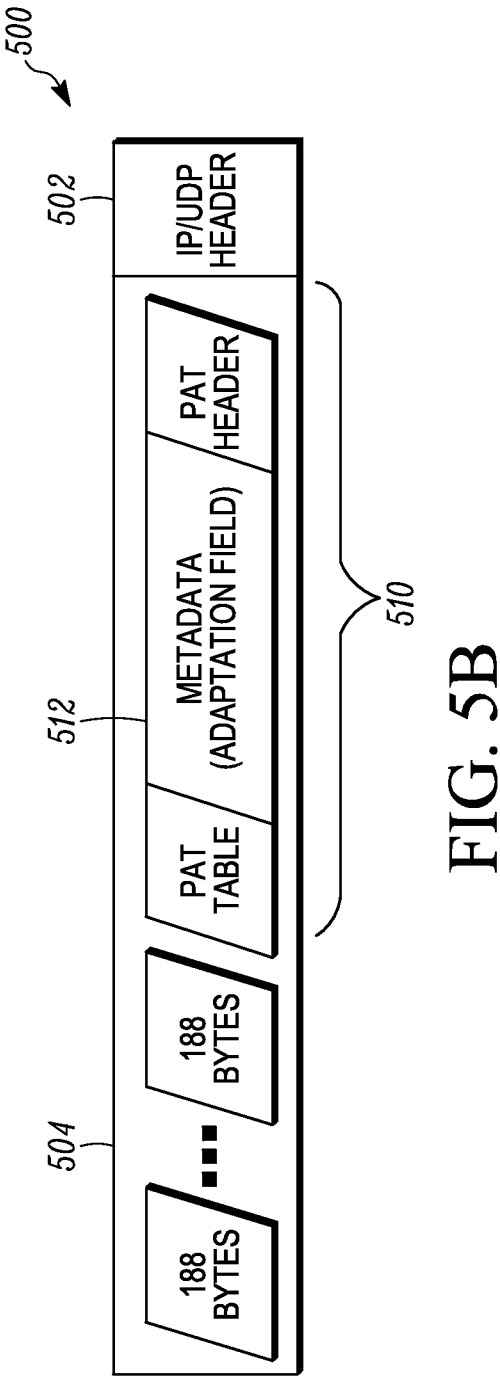

ENCODER-AIDED SEGMENTATION FOR ADAPTIVE STREAMING

CROSS-REFERENCES TO RELATED APPLICATIONS

The present application claims the benefit and priority under 35 U.S.C. 119(e) of U.S. Provisional Application No. 61/525,184, filed Aug. 19, 2011, entitled "TRANSCODER AIDED SEGMENTATION FOR HTTP ADAPTIVE STREAMING," the entire contents of which are incorporated herein by reference for all purposes.

In addition, the present application is related to co-pending U.S. patent application Ser. No. 13/588,852, filed concurrently herewith and titled DEVICES, SYSTEMS, AND METHODS FOR ADAPTIVE SWITCHING OF MULTICAST CONTENT DELIVERY TO OPTIMIZE BANDWIDTH USAGE, the entire contents of which are incorporated herein by reference.

BACKGROUND

Adaptive bit rate streaming (also referred to as "adaptive streaming") is a technology that allows for the adaptive delivery of audio/video content to clients. It is enabled by an encoder that encodes source content into multiple content streams having different bit rates and a packager that divides each of the multiple content streams into segments. The segments are then hosted on a server, such as a Hypertext Transport Protocol (HTTP) server, for client consumption.

When a client accesses the content from the server, the client intelligently requests and presents segments corresponding to the content stream whose bit rate characteristics most closely match the capabilities of the client and the client's network connection. As part of this process, the client adapts to fluctuating conditions during playback by dynamically switching, at the segment level, between different content streams on an as-needed basis. The client may switch back and forth between segments of different content streams throughout playback of the content to maximize playback quality in view of current network bandwidth conditions.

One issue with preparing source content for delivery via adaptive streaming lies in the segmentation process performed by the packager. In particular, the packager needs to buffer and analyze each of the content streams generated by the encoder in order to determine appropriate locations in the stream where segmentation can occur. This analysis is complex and time-consuming since it requires comprehensive inspection of the data in each content stream.

SUMMARY

In one embodiment, a method for encoding content includes receiving source content and encoding the source content into a plurality of content streams. The encoding includes aligning the plurality of content streams at Group of Pictures (GOP) boundaries. The encoding further includes embedding, in each content stream, metadata identifying segmentation points within the content stream, where the segmentation points correspond to one or more of the GOP boundaries.

In another embodiment, a non-transitory computer-readable storage medium is provided that includes program code executable by a processor for encoding content. The program code includes code that causes the processor to receive source content and code that causes the processor to encode the source content into a plurality of content streams. The code that causes the processor to encode the source content includes code that causes the processor to align the plurality of content streams at GOP boundaries. The code that causes the processor to encode the source content further includes code that causes the processor to embed, in each content stream, metadata identifying segmentation points within the content stream, where the segmentation points correspond to one or more of the GOP boundaries.

In yet another embodiment, a system for encoding content is provided that includes a processor. The processor is configured to receive source content and encode the source content into a plurality of content streams. The encoding includes aligning the plurality of content streams at GOP boundaries. The encoding further includes embedding, in each content stream, metadata identifying segmentation points within the content stream, where the segmentation points correspond to one or more of the GOP boundaries.

The following detailed description and accompanying drawings provide a better understanding of the nature and advantages of particular embodiments.

BRIEF DESCRIPTION OF THE DRAWINGS

FIGS. 5A, 5B, 5C, and 5D illustrate techniques for embedding metadata in a content stream according to various embodiments.

DETAILED DESCRIPTION

Described herein are encoder-aided segmentation techniques for adaptive streaming. In the following description, for purposes of explanation, numerous examples and specific details are set forth in order to provide a thorough understanding of various embodiments. Particular embodiments as defined by the claims may include some or all of the features in these examples alone or in combination with other features described below, and may further include modifications and equivalents of the features and concepts described herein.

System Overview

Figure 1:
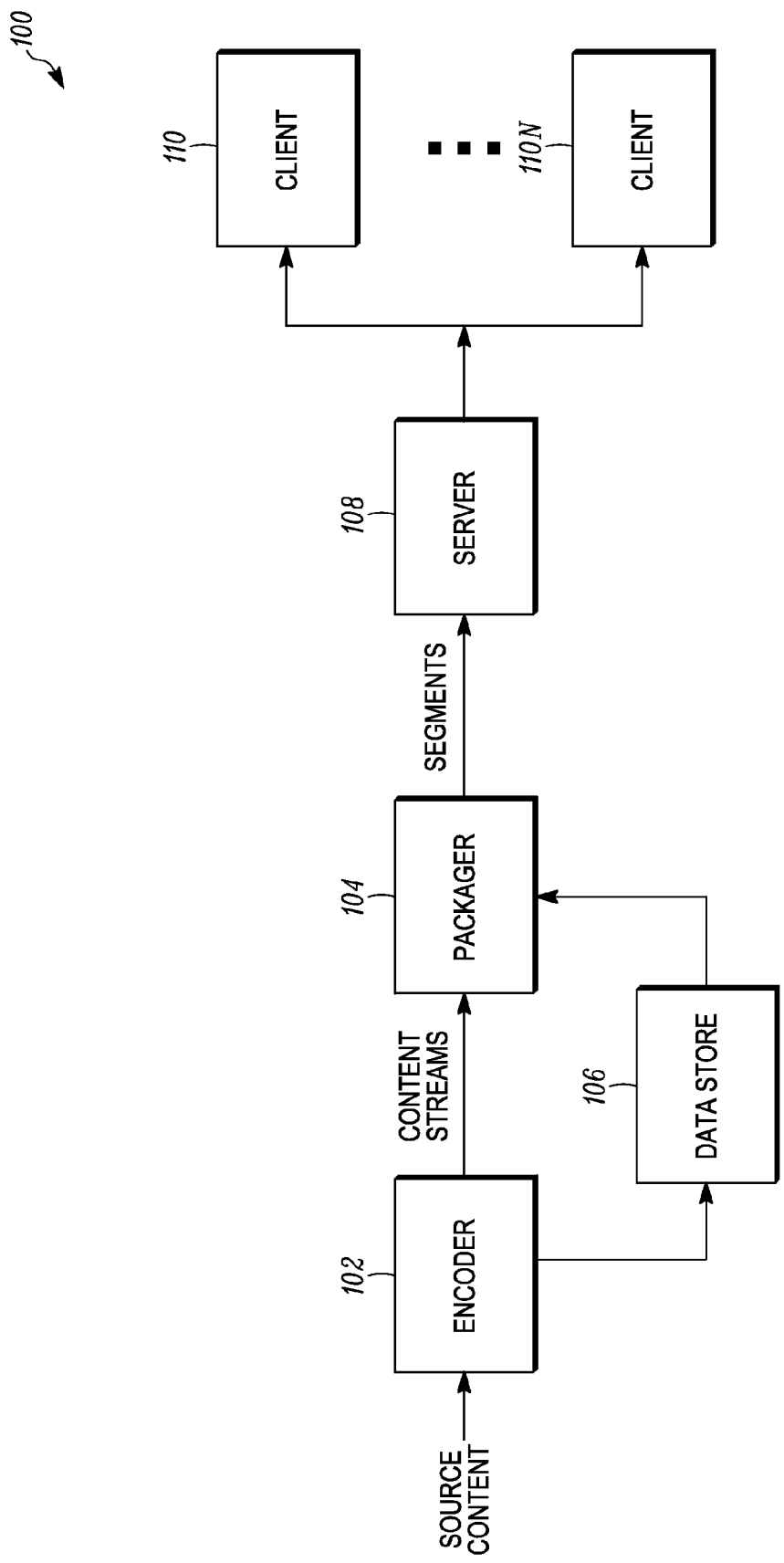
FIG. 1 illustrates a system environment according to one embodiment.

FIG. 1 illustrates a system environment 100 for performing adaptive streaming according to one embodiment. As shown, system environment 100 includes an encoder 102, a packager 104, a data store 106, a server 108, and a number of clients 110-110N.

Encoder 102 is a software and/or hardware-based component that can receive source content (e.g., a high bit rate audio/video stream or file) and encode the source content into multiple content streams. In one embodiment, each content stream generated by encoder 102 can include the same content as the source content, but can be encoded at a different bit rate (and optionally, can have a different resolution). By way of example, encoder 102 can encode a source file/stream S into a three content streams P1, P2, and P3 that represent different versions of S, where P1 is a "low" bit rate stream (e.g., 100 Kilobits per second (Kbps)), P2 is a "medium" bit rate stream (e.g., 500 Kbps), and P3 is a "high" bit rate stream (e.g., 1 Megabit per second (Mbps)). Generally speaking, as the bit rate of an audio/video stream increases, the perceived quality of the stream increases. However, the bandwidth and processing requirements needed to receive and decode the stream in real-time also increase. Thus, the multiple content streams generated by encoder 102 can allow the source content to be efficiently distributed to, and played back by, clients have varying capabilities and operating under varying network conditions.

Figure 2:
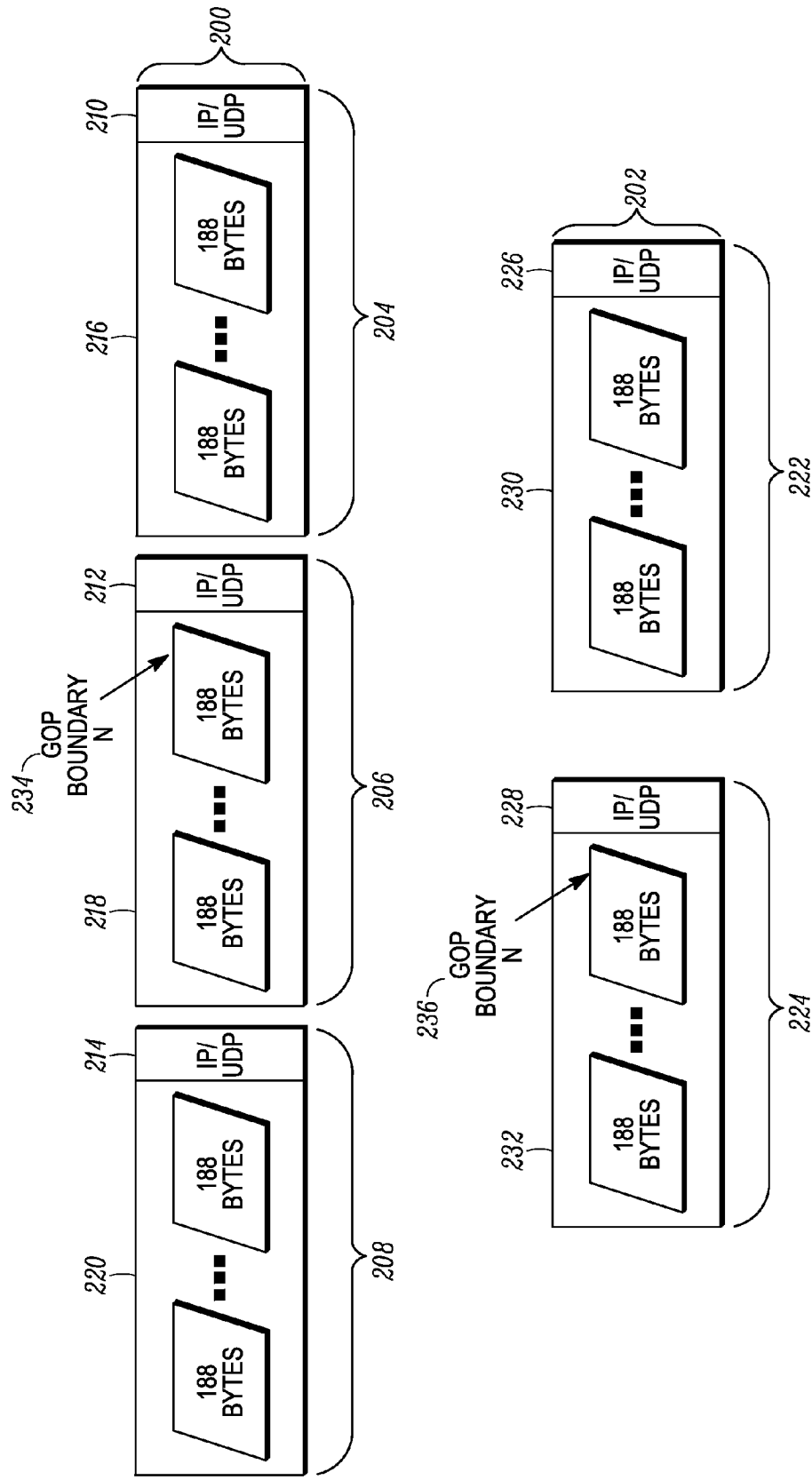
FIG. 2 illustrates exemplary content streams generated by an encoder according to one embodiment.

FIG. 2 illustrates two exemplary content streams that can be generated by encoder 102 from a single source stream or file in one embodiment. In particular, FIG. 2 depicts a high bit rate stream 200 that represents a high quality version of the source content and a low bit rate stream 202 that represents a lower quality version of the source content. In this example, streams 200 and 202 are each depicted as an MPEG-2 transport stream that is encapsulated in a number of Internet Protocol (IP) packets. For instance, high bit rate stream 200 includes IP packets 204, 206, and 208, where each IP packet includes an IP/UDP header portion (210, 212, and 214 respectively) and an MPEG-2 transport packet portion (216, 218, and 220 respectively). Similarly, low bit rate stream 202 includes IP packets 222 and 224, where each IP packet includes an IP/UDP header portion (226 and 228 respectively) and an MPEG-2 transport packet portion (230 and 232 respectively). Within the MPEG-2 transport packet portion of each IP packet, a number of 188 byte transport packets are stored. These transport packets represent the payload for one or multiplexed MPEG audio and/or video streams (known as "elementary streams") in the MPEG-2 transport stream.

The stream structure shown in FIG. 2 can be useful in contexts that require transmission of streams 200 and 202 over a computer network infrastructure, such as Internet Protocol Television (IPTV) and other Internet-based content delivery systems. For instance, the encapsulation of streams 200 and 202 into IP packets can allow for the delivery of these streams to IP clients via IP multicast (e.g., in the case of a live broadcast) or via IP unicast (e.g., in the case of video on demand (VOD)). In other contexts that do not require transmission over IP networks, alternative types of stream structures can be used.

In certain embodiments, as part of encoding and generating content streams 200 and 202, encoder 102 can align the streams at Group of Pictures (GOP) boundaries. For example, in FIG. 2, stream 200 and stream 202 are aligned at a common GOP boundary N (identified by reference numerals 234 and 236 in streams 200 and 202 respectively). A GOP boundary is a candidate location in an MPEG video stream that begins with an instantaneous decoder refresh (IDR) frame. An IDR is a type of frame that can be fully decoded without any need to reference other surrounding frames in the video stream. Further, each IDR frame represents the start of a new group of related frames, or pictures (hence "GOP") in the stream, such that any frames following the IDR frame cannot refer back to frames preceding the IDR frame.

For purposes of the present disclosure, when multiple streams are said to be aligned at GOP boundaries (or "GOP aligned"), the multiple streams are configured such that their aligned GOP boundaries correspond to the start of IDR frames that all share the same presentation timestamp (PTS) and all represent the same content. Thus, in FIG. 2, aligned GOP boundary N corresponds to the start of IDR frames in streams 200 and 202 respectively that share the same PTS and represent the identical scene or frame of content from the original source content. As described in further detail below, this step of GOP aligning the content streams enables seamless switching between the streams at downstream client devices.

Returning to FIG. 1, once multiple content streams have been generated by encoder 102, the multiple streams can be passed (either directly via, e.g., a streaming protocol or indirectly via, e.g., a non-real-time file handover through data store 106) to packager 104. Packager 104 is a software and/or hardware-based component that can process the content streams and divide each content stream into segments (also known as "chunks"). The locations at which this segmentation occurs within each content stream (known as the "segmentation points") can directly map to one or more of the aligned GOP boundaries described above. The segments can then be stored as individual files and hosted on server 108 (along with a manifest file identifying the segments and their sequence) for delivery to clients 110-110N.

At the time of initiating playback of the content hosted on server 108, each client can intelligently request segments of the content stream whose bit rate characteristics most closely match the capabilities of the client and the client's network connection. These requested segments can then be decoded and presented in order on, e.g., the client's display. In addition, each client can, during the course of playback, dynamically switch to requesting segments of different content streams (corresponding to different bit rates) in response to fluctuating network conditions.

For example, assume that client 110 initially requests and presents segments from high bit rate stream 200 of FIG. 2, as that stream provides the best playback quality in view of the client's capabilities and network connection at the time of initiating playback. Further, assume that client 110's network bandwidth suddenly drops, such that the client can no longer support playback of high bit rate stream 200 (due to, e.g., network congestion or other factors). In this scenario, client 110 can automatically switch to requesting and presenting segments of low bit rate stream 202. Once client 110's network bandwidth returns to a normal level, client 110 can automatically switch back to requesting and presenting segments of high bit rate stream 200. In this manner, client 110 can adaptively change playback quality in response to changing conditions. Since the segments received by client 110 are divided at aligned GOP boundaries, the switching that occurs between segments of different content streams can appear seamless to the end-user, with no gaps or hiccups during playback.

As noted in the Background section, one issue with the adaptive streaming process described above pertains to the segmentation performed by packager 104. In existing implementations, packager 104 generally needs to buffer and analyze each of the content streams received from encoder 102 in order to determine the aligned GOP boundaries at which segmentation can occur. This analysis is complex and time-consuming, since it requires comprehensive inspection of the video data in each content stream.

To address this, in certain embodiments the responsibility of determining segmentation points in the content streams can be offloaded from packager 104 to encoder 102. For example, as part of GOP aligning the content streams (which necessarily involves identification and/or creation of GOP boundaries), encoder 102 can mark one or more of the GOP boundaries in each stream as segmentation points. Encoder 102 can then embed metadata in each content stream that identifies the segmentation points and can pass the content streams (with the embedded metadata) to packager 104 for segmentation.

Upon receiving each content stream, packager 104 can avoid the time-consuming and complex process of buffering and analyzing the video data in the stream to locate aligned GOP boundaries. Instead, packager 104 can simply read the metadata embedded by encoder 102 that identifies the segmentations points and, based upon the metadata, directly write out each segment to a file. Thus, the time needed to carry out the segmentation process (as well as the complexity of the software and/or hardware needed to implement packager 104) can be significantly reduced.

In certain embodiments, the types of metadata that are embedded in the content streams by encoder 102 can include additional information (beyond segmentation information) that may be useful to packager 104, such as advertisement splicing points, encryption/decryption keys, and more. In addition, the location(s) at which the metadata is embedded in the content streams may vary. These and other features are described in further detail below.

It should be appreciated that system environment 100 is illustrative and is not intended to limit the embodiments disclosed herein. For example, although encoder 102 and packager 104 are shown as two separate components, in certain embodiments encoder 102 and packager 104 can be combined into a single, integral component. Further, although only a single packager 104 is depicted, in certain embodiments the functions of packager 104 can be replicated by multiple, distributed packagers that are located at edge distribution points in a network. Yet further, the various entities depicted in system environment 100 can have other capabilities or include other components that are not specifically described. One of ordinary skill in the art will recognize many variations, modifications, and alternatives.

Metadata Insertion and Retrieval for Segmentation

Figure 3A:
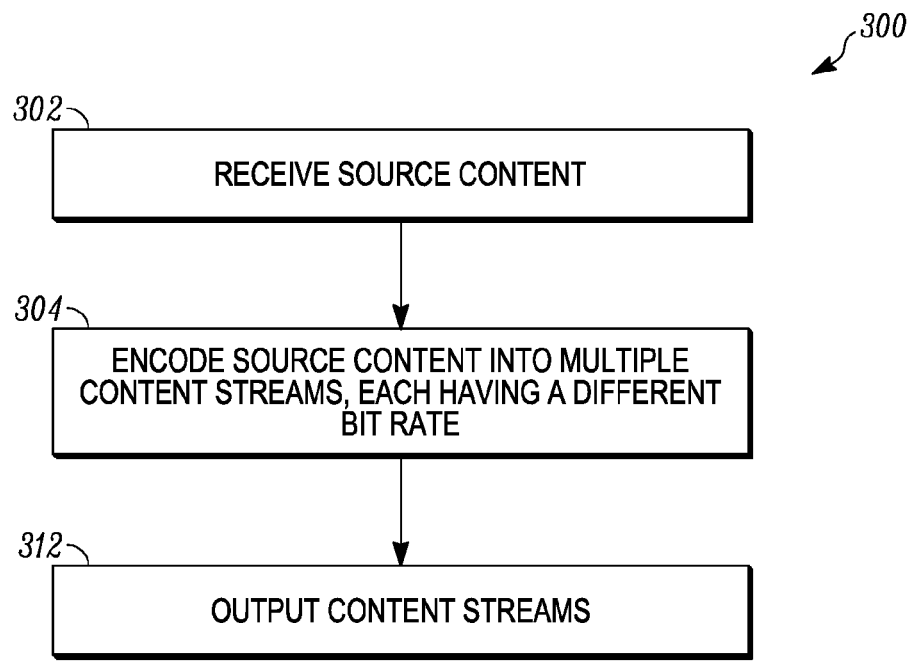
FIGS. 3A and 3B illustrates a process for encoding content according to one embodiment.

FIG. 3A illustrates a process 300 that can be performed by encoder 102 for encoding source content into multiple bit rate content streams according to one embodiment. As part of process 300, encoder 102 can insert segmentation metadata into the content streams to facilitate segmentation by a downstream packager (such as packager 104).

At block 302, encoder 102 can receive source content that is intended for delivery to clients via adaptive streaming. The source content can be, for example, a live audio/video stream that is ingested from a broadcast source, or an audio/video file that is retrieved from storage. If the source content has been previously compressed, encoder 102 can decode the source content into a decompressed format.

At block 304, encoder 102 can encode the source content into multiple content streams, where each content stream has a different bit rate (and optionally, a different resolution). In certain embodiments, the content streams generated at this block can be encoded into MPEG-2 transport streams that are encapsulated in IP packets, such as streams 200 and 202 shown in FIG. 2. In other embodiments, the content streams can be encoded into any other type of audio/video stream or file format.

Figure 3B:
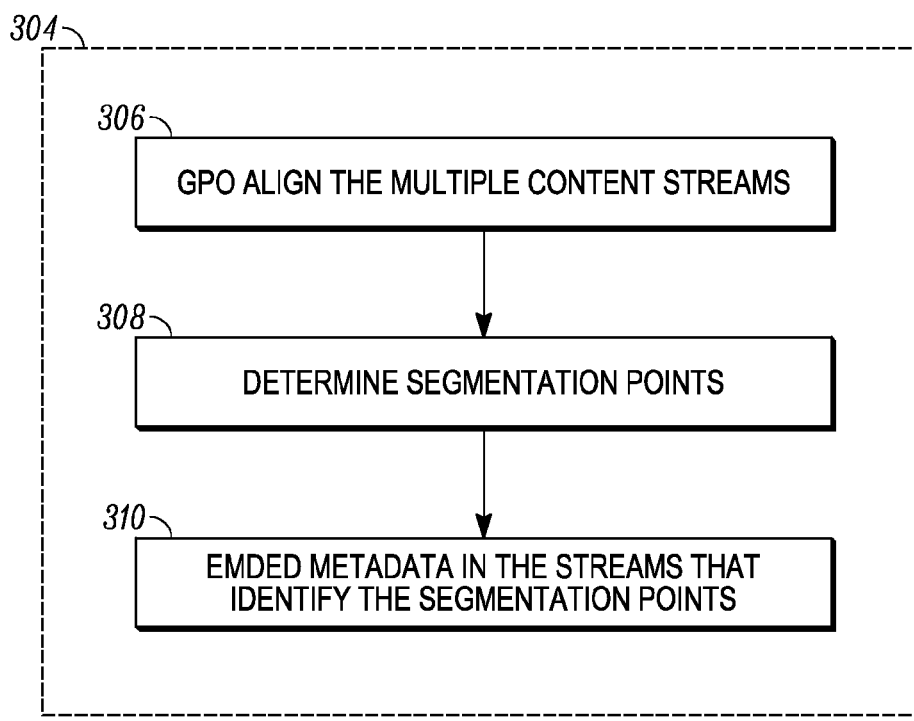

Within encoding block 304, encoder 102 can perform a series of steps depicted in FIG. 3B. For example, at block 306 of FIG. 3B, encoder 102 can GOP align the content streams. This can involve synchronizing IDR frames across the content streams such that the IDRs that share the same PTS also include the same scene content from the source content. An example of such GOP alignment is depicted in FIG. 2, where aligned GOP boundary N (234/236) corresponds to the start of synchronized IDR frames in streams 200 and 202 respectively.

At block 308 of FIG. 3B, encoder 102 can mark certain GOP boundaries in the content streams as segmentation points. This can be based on a predetermined segment interval parameter that indicates an approximate length (in, e.g., seconds) for each segment. In various embodiments, encoder 102 can carry out the marking process such that segmentation points sharing the same name/identifier are mapped to aligned GOP boundaries across the content streams. This ensures that each content stream is divided into the same number and sequence of segments, and that each ordered segment represents the same content across streams.

At block 310 of FIG. 3B, encoder 102 can embed metadata in each content stream that identifies the stream's segmentation points. In one embodiment, this metadata can include, for each segmentation point, a segment identifier (e.g., a 32 bit sequence number), a segment size (e.g., 31 bit value indicating the size of the segment in bytes), and a presentation time stamp (e.g., a 33 bit value indicating the PTS of the first frame in the segment). Other types of metadata fields can also be included.

The locations at which the metadata is embedded in the content streams can vary. In certain embodiments, encoder 102 can embed the metadata at location(s) that make the metadata relatively easy for packager 104 to find. For example, encoder 102 can embed the metadata at locations that do not require packager 104 to traverse into lower-level (e.g., deeply encapsulated) data constructs of the stream. In further embodiments, encoder 102 can embed the metadata at locations that do not adversely affect compliance of the content stream with its corresponding video/container definition standard. Four specific approaches for embedding metadata in an IP-encapsulated MPEG-2 transport stream are described with respect to FIGS. 5A-5D below.

Once the content streams have been encoded and enriched with metadata per FIG. 3B, the flow of process 300 can return to FIG. 3A. At block 312, encoder 102 can output the content streams to, e.g., data store 106 or directly to packager 104 for segmentation.

Figure 4:
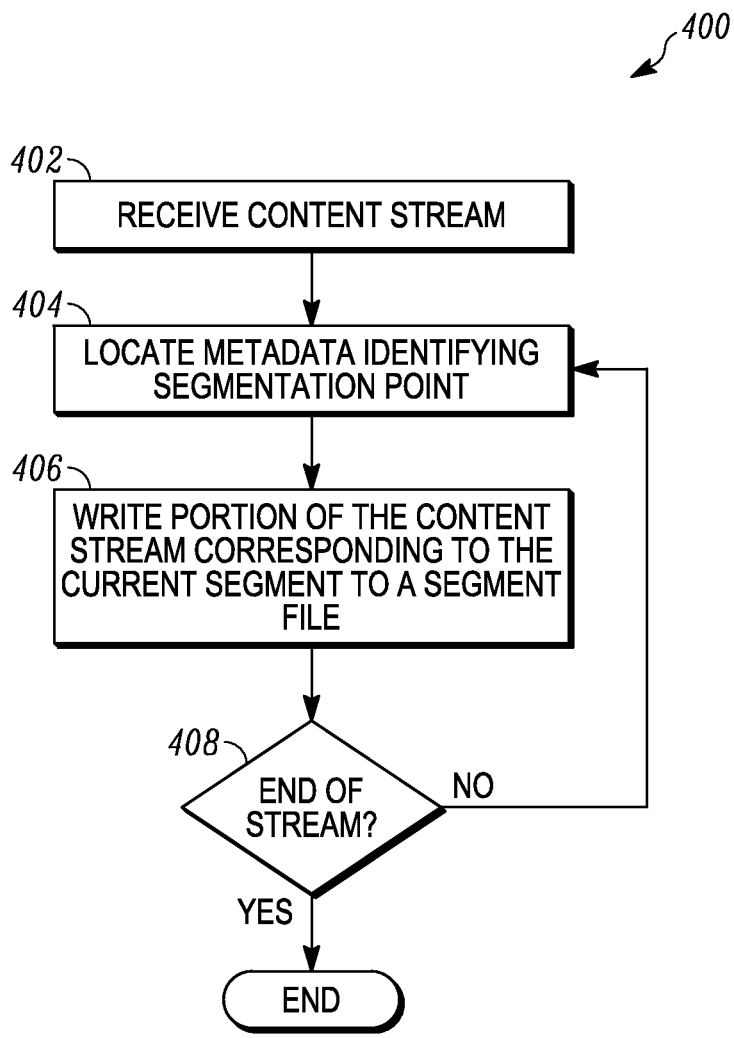
FIG. 4 illustrates a process for segmenting content streams according to one embodiment.

FIG. 4 illustrates a process 400 that can be performed by packager 104 for segmenting the content streams that are output by encoder 102 at block 312 of FIG. 3A (including those stored in data store 106). At blocks 402 and 404, packager 104 can receive and parse a content stream to locate metadata identifying a segmentation point. Upon finding such metadata, packager 104 can write the portion of the content stream corresponding to the current segment to a segment file (block 406). Packager 104 can then determine whether the end of the stream has been reached (block 408). If so, process 400 can end. Otherwise, the flow of process 400 can return to block 404 so that further segments can be identified and written to file.

Although not shown, process 400 can be repeated for each content stream output by encoder 102. In certain embodiments, packager 400 can perform process 400 on multiple content streams in parallel.

With the foregoing processing, the work performed by packager 104 is significantly simplified over existing implementations, since packager 104 no longer needs to search for aligned GOP boundaries on a frame-by-frame basis within each stream. Rather, packager 104 need only locate the metadata embedded by encoder 102 and write segments to file based on the metadata, without having to inspect the actual video data of the stream. In a particular embodiment, the metadata for each segmentation point can provide information indicating where the next segmentation point is located, thereby allowing packager 104 to quickly traverse from one segmentation point to the next in the stream.

Additional Metadata Types

In addition to segmentation metadata, encoder 102 can embed other types of metadata in the content streams it generates. For example, in certain embodiments, encoder 102 can detect Society of Cable Telecommunications Engineers (SCTE) 35 commands in the source content. SCTE 35 commands are typically included in TV broadcasts and define splicing points for advertisements. In these embodiments, encoder 102 can encode the content streams such that the advertisement splicing points defined by the detected SCTE 35 commands are aligned with segmentation points, and can embed metadata identifying the advertisement splicing points into the streams. Packager 104 can then read the metadata when performing segmentation and can insert advertisements as needed at the segment level. Alternatively, packager 104 can translate the metadata identifying the advertisement splicing points into a tagging format that is included in the manifest file generated by the packager. This tagging information can be used by downstream components (e.g., a server or client) to perform targeted advertisement insertion or replacement.

In further embodiments, encoder 102 can detect program replacement (i.e., "blackout") commands in the source content. Such program replacement commands are typically used for local sports programming, and define a period of time during which the programming in a broadcast stream should be blacked out (i.e., replaced with alternative content). In these embodiments, encoder 102 can encode the content streams such that the points at which this program replacement should occur (as defined by the detected program replacement commands) are aligned with segmentation points. Further, encoder 102 can embed metadata identifying the program replacement points into the streams. Packager 104 can then read the metadata when performing segmentation and can insert alternative content/programming as needed at the segment level.

In yet further embodiments, encoder 102 can retrieve, during the encoding process, one or more encryption/decryption keys for encrypting the content in the content streams. These encryption/decryption keys can be embedded as metadata in the content streams and passed to packager 104 or other downstream components to facilitate decryption of the content streams.

Metadata Location

As noted with respect to FIG. 3, encoder 102 can embed segmentation metadata (as well as the other types of metadata) at various locations within a content stream so that is it easily accessible by packager 104. FIGS. 5A, 5B, 5C, and 5D illustrate four different ways in which encoder 102 can embed metadata in a content stream that is formatted as an IP-encapsulated MPEG-2 transport stream (e.g., streams 200 and 202 of FIG. 2).

FIG. 5A illustrates an exemplary IP packet 500 of an IP-encapsulated MPEG-2 transport stream that includes an IP/UDP header portion 502 and an MPEG-2 transport packet portion 504. MPEG-2 transport packet portion 504 includes a number of 188 byte MPEG transport packets, the first of which begins with a segmentation point in the stream. Thus, it would be desirable to embed metadata within IP packet 500 to signify the location of this segmentation point.

In the embodiment of FIG. 5A, this can be accomplished by including the segmentation metadata in an IP header option field of IP/UDP header portion 502 (shown by reference numeral 506). For instance, the segmentation metadata can be included in one or more of option values 26-29, which are currently undefined. With this approach, the metadata can be easily accessed without having to inspect transport packet portion 504 of IP packet 500. Further, since transport packet portion 504 is not modified, full compliance with the MPEG-2 transport stream standard is maintained.

One issue with the approach of FIG. 5A is that some network devices (e.g., routers or switches) may be configured to drop IP packets that include data in the undefined option values of the IP header option field. Thus, in some embodiments, measures can be taken to ensure that such packets are passed through the desired routing path. These measures can include, e.g., performing a traffic test on all IP routes.

FIG. 5B illustrates an alternative version of IP packet 500 in which the segmentation metadata is embedded in the header of a Program Allocation Table (PAT) packet 510 in transport packet portion 504 (rather than being embedded in IP/UDP header portion 502). Generally speaking, a PAT packet is a 188 byte transport packet defined by the MPEG-2 transport stream standard that contains a header portion and a PAT table. The PAT table includes a list of all elementary streams in the transport stream, as well as identifiers for certain other tables that are used to determine the structure of the transport stream. In certain embodiments, a PAT packet is included as the first transport packet in the MPEG-2 transport stream at a segmentation point.

In the embodiment of FIG. 5B, the segmentation metadata is specifically embedded as "transport private data" in an adaptation field of the PAT packet header (shown by reference numeral 512). The transport private data section of the adaptation field is not currently used in the MPEG-2 transport stream standard, and thus this approach maintains compliance with the standard.

Figure 5C:
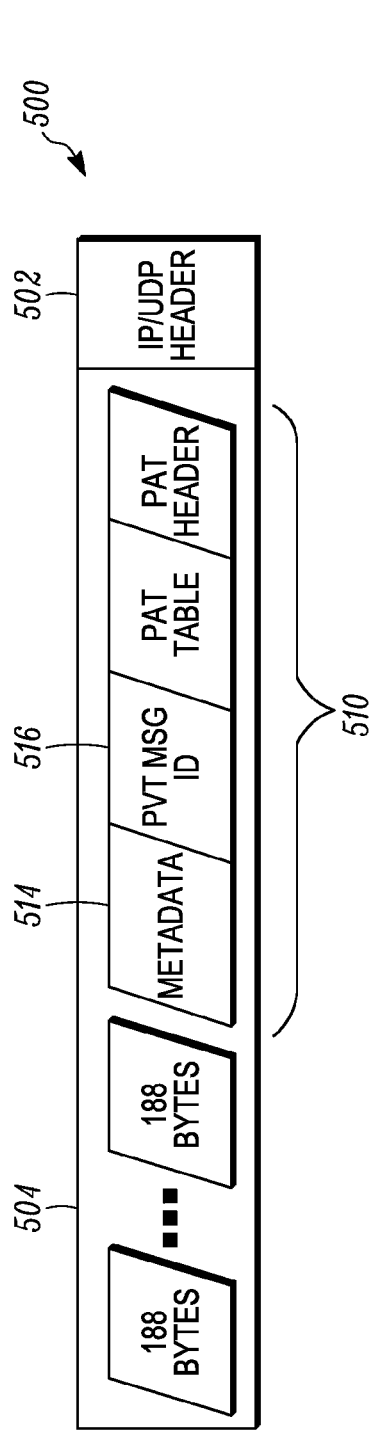

FIG. 5C illustrates yet another version of IP packet 500 in which the segmentation metadata is carried as transport private data following the PAT table in PAT packet 510 (shown by reference numeral 514). In this example, PAT packet 510 can include a private message identifier 516 that indicates to packager 104 that this PAT packet includes metadata. In a particular embodiment, private message identifier 516 and metadata 514 can follow directly after PAT table in the structure of PAT packet 510. In other embodiments, 516 and 514 can be stored in a fixed number of bytes from the end of PAT packet 510.

Figure 5D:
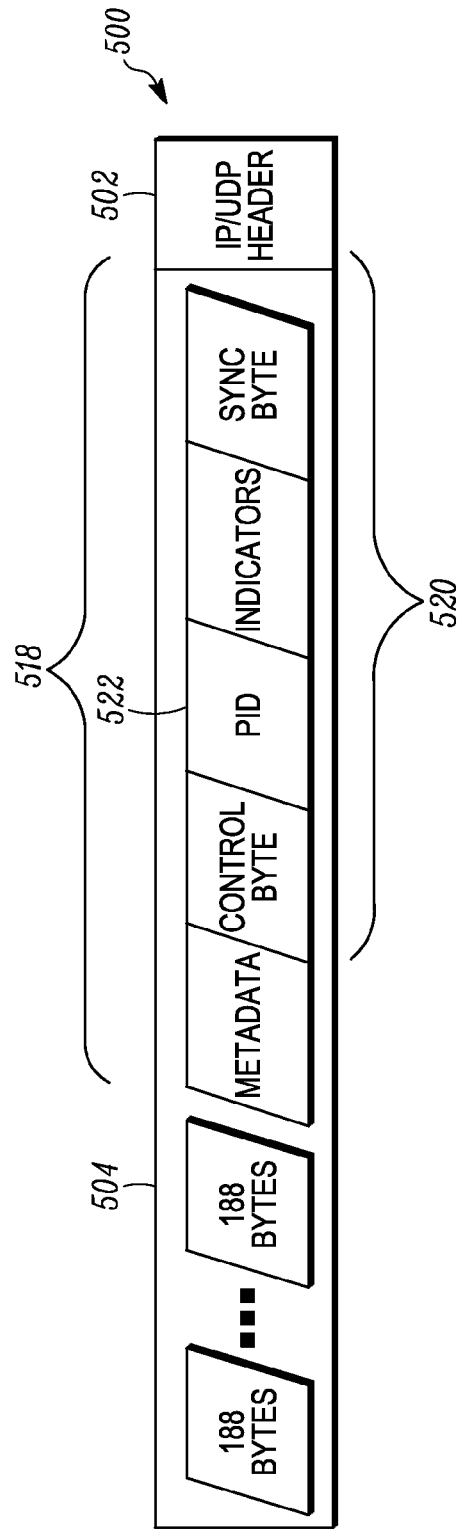

FIG. 5D illustrates a fourth version of IP packet 500 in which the segmentation metadata is carried as a separate elementary stream in the MPEG-2 transport stream (shown by 188 byte packet 518 in transport packet portion 504). In this embodiment, the metadata elementary stream can have its own packet identifier (PID) that distinguishes it from other elementary streams in the transport stream. This PID is shown as being included in a 4 byte header portion 520 of packet 518 via reference numeral 522. One advantage with this approach is that there is no limitation on the length of the metadata that can be included in the content stream, since additional metadata can simply be carried in additional 188 byte transport packets.

One potential issue with the embodiment of FIG. 5D is that the PID of an elementary stream typically needs to be parsed out of a number of tables (including the PAT table) in order to identify the packets for that elementary stream in a transport stream. To avoid this, in one embodiment, the PID used for the metadata elementary stream can correspond to a predefined, reserved PID. Thus, packager 104 can know, a priori, to look for this predefined PID in the transport stream in order to find the segmentation metadata (rather than parsing the stream tables). In the current MPEG-2 transport stream standard, 16

PIDs are reserved (0x0000 through 0x000F), although only the first three are in use. Thus, one of the remaining 13 reserved PIDs can be used to identify the metadata elementary stream.

Computer System Embodiment

Figure 6:
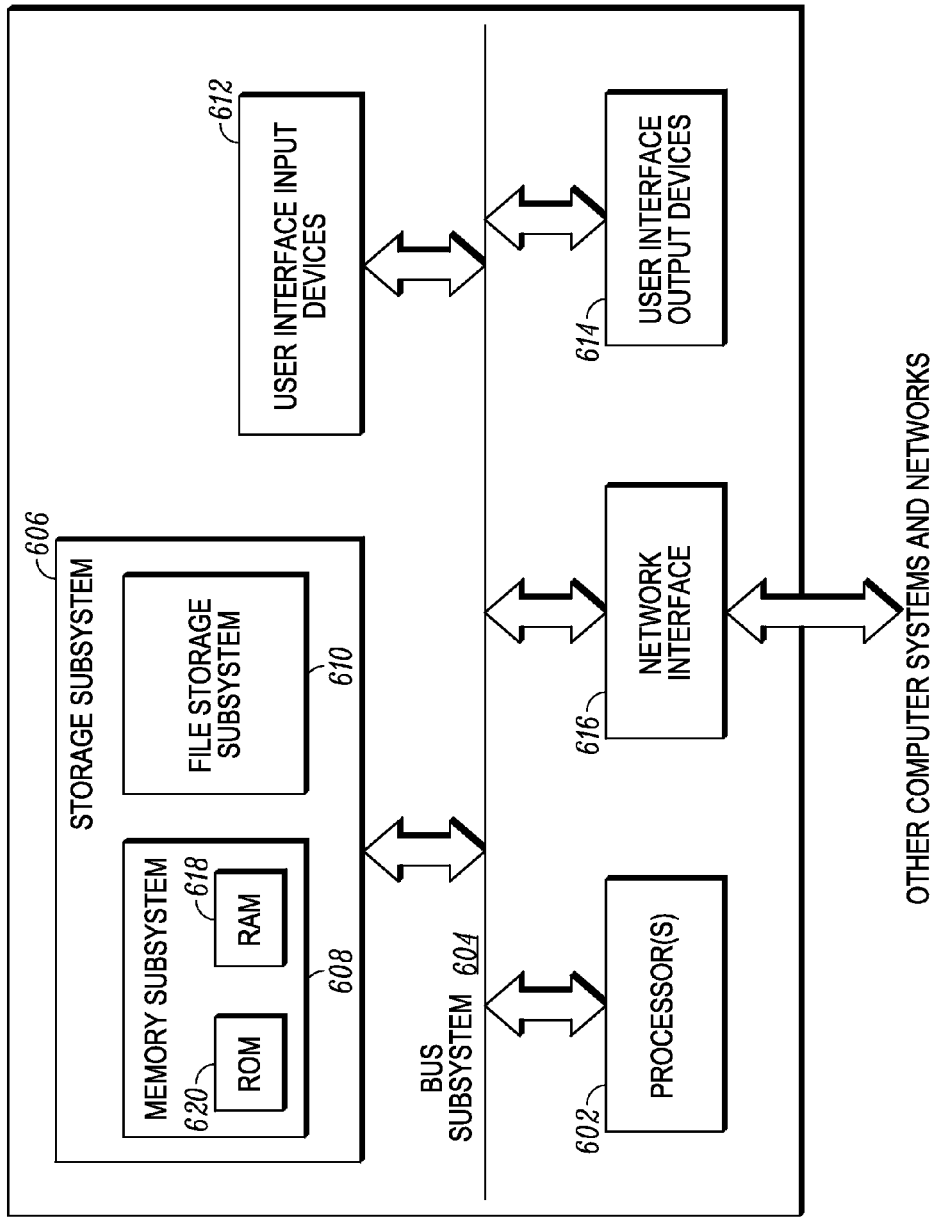
FIG. 6 illustrates a computer system according to one embodiment.

FIG. 6 illustrates a computer system 600 according to one embodiment. Computer system 600 can be used to execute or implement any of the components/systems described with respect to FIG. 1, such as encoder 102 or packager 104. As shown in FIG. 6, computer system 600 includes one or more processors 602 that communicate with a number of peripheral devices via a bus subsystem 604. These peripheral devices include a storage subsystem 606 (comprising a memory subsystem 608 and a file storage subsystem 610), user interface input devices 612, user interface output devices 614, and a network interface subsystem 616.

Bus subsystem 604 can provide a mechanism for letting the various components and subsystems of computer system 600 communicate with each other as intended. Although bus subsystem 604 is shown schematically as a single bus, alternative embodiments of the bus subsystem can utilize multiple busses.

Network interface subsystem 616 can serve as an interface for communicating data between computer system 600 and other computer systems or networks. Embodiments of network interface subsystem 616 can include, e.g., an Ethernet card, a Wi-Fi and/or cellular adapter, a modem (telephone, satellite, cable, ISDN, etc.), digital subscriber line (DSL) units, and/or the like.

User interface input devices 612 can include a keyboard, pointing devices (e.g., mouse, trackball, touchpad, etc.), a scanner, a barcode scanner, a touch-screen incorporated into a display, audio input devices (e.g., voice recognition systems, microphones, etc.) and other types of input devices. In general, use of the term "input device" is intended to include all possible types of devices and mechanisms for inputting information into computer system 600.

User interface output devices 614 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 600.

Storage subsystem 606 includes a memory subsystem 608 and a file/disk storage subsystem 610. Subsystems 608 and 610 represent non-transitory computer-readable storage media that can store program code and/or data that provide the functionality of the embodiments described herein.

Memory subsystem 608 includes a number of memories including a main random access memory (RAM) 618 for storage of instructions and data during program execution and a read-only memory (ROM) 620 in which fixed instructions are stored. File storage subsystem 610 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
receiving, by a system including a processor, source content;
encoding, by the system, the source content into a plurality of content streams, wherein the encoding comprises:
aligning the plurality of content streams at Group of Pictures (GOP) boundaries; and
embedding, in each content stream, metadata identifying segmentation points within the content stream, wherein the segmentation points correspond to one or more of the GOP boundaries,
wherein each content stream comprises a plurality of Internet Protocol (IP) data packets, and wherein each IP data packet comprises an IP/UDP header portion and a transport packet portion, and
the metadata is included in the IP/User Datagram Protocol (UDP) header portion of one or more of the plurality of IP data packets; and
packaging, by the system, the plurality of content streams, wherein the packaging comprises segmenting each of the plurality of content streams based on the metadata identifying the segmentation points.

2. The method of claim 1 wherein the metadata is embedded in each content stream at predetermined segment intervals.

3. The method of claim 1 wherein the metadata includes, for each segmentation point, a segment identifier, a segment size value, and a presentation time stamp.

4. The method of claim 1 wherein, within the IP/UDP header portion, the metadata is included in an undefined option field.

5. The method of claim 1 wherein the metadata is included in the transport packet portion of one or more of the plurality of IP data packets.

6. The method of claim 5 wherein the transport packet portion comprises a plurality of transport packets in MPEG-2 transport stream format, the plurality of transport packets including a Program Allocation Table (PAT) transport packet, and wherein the metadata is included in the PAT transport packet.

7. The method of claim 6 wherein the metadata is included in a header of the PAT transport packet.

8. The method of claim 6 wherein the metadata is included as data following a program allocation table in the PAT transport packet.

9. The method of claim 1 wherein the encoding further comprises:
detecting a Society of Cable Telecommunications Engineers (SCTE) 35 command in the source content; and
embedding, in each content stream, metadata identifying an advertisement splicing point based on the detected SCTE 35 command, the advertisement splicing point being aligned with a segmentation point in the content stream.

10. The method of claim 9 further comprising:
receiving the plurality of content streams; and
splicing, into each content stream, an advertisement at the advertisement splicing point.

11. The method of claim 9 further comprising:
receiving the plurality of content streams;
translating the metadata identifying the advertisement splicing point into a tagging format; and
including the translated metadata in a segment manifest file the translated metadata being usable by a downstream component for advertisement insertion or replacement.

12. The method of claim 1 wherein the encoding further comprises:
detecting a blackout command in the source content; and
embedding, in each content stream, metadata identifying an alternative content splicing point based on the detected blackout command, the alternative content splicing point being aligned with a segmentation point in the content stream.

13. The method of claim 12 further comprising:
receiving the plurality of content streams; and
splicing, into each content stream, alternative content at the alternative content splicing point.

14. The method of claim 1 wherein the encoding further comprises:
receiving a key for encrypting content in the plurality of content streams; and
embedding, in each content stream, metadata identifying the key.

15. The method of claim 14 further comprising:
receiving the plurality of content streams; and
retrieving the key from the metadata; and
decrypting each content stream using the key.

16. A non-transitory computer-readable medium having instructions stored thereon that, in response to execution, cause a system including a processor to perform operations comprising:
receiving source content;
encoding the source content into a plurality of content streams, wherein the encoding comprises:
aligning the plurality of content streams at Group of Pictures (GOP) boundaries; and
embedding, in each content stream, metadata identifying segmentation points within the content stream, wherein the segmentation points correspond to one or more of the GOP boundaries,
wherein each content stream comprises a plurality of Internet Protocol (IP) data packets, and wherein each IP data packet comprises an IP/UDP header portion and a transport packet portion, and
the metadata is included in the IP/User Datagram Protocol (UDP) header portion of one or more of the plurality of IP data packets; and
packaging the plurality of content streams, wherein the packaging comprises segmenting each of the plurality of content streams based on the metadata identifying the segmentation points.

17. A system comprising:
a processor, communicatively coupled to a memory that stores computer-executable instructions, that executes or facilitates execution of the computer-executable instructions, comprising:
an encoder component configured to:
receive source content;
encode the source content into a plurality of content streams, comprising:
align the plurality of content streams at Group of Pictures (GOP) boundaries; and
embed, in each content stream, metadata identifying segmentation points within the content stream, wherein the segmentation points correspond to one or more of the GOP boundaries,
wherein each content stream comprises a plurality of Internet Protocol (IP) data packets, and wherein each IP data packet comprises an IP/UDP header portion and a transport packet portion, and
the metadata is included in the IP/User Datagram Protocol (UDP) header portion of one or more of the plurality of IP data packets; and
a packager component configured to package the plurality of content streams using segments of each of the plurality of content streams based on the metadata identifying the segmentation points.

* * * * *